United States Patent
Asakawa

(10) Patent No.: US 9,213,926 B2
(45) Date of Patent: Dec. 15, 2015

(54) IMAGE FORMING SYSTEM AND IMAGE FORMING SYSTEM CONTROL METHOD FOR CONTROLLING IMAGE FORMING CONDITIONS OF A JOB IN ACCORDANCE WITH A DESIGNATED POST-PROCESSING

(71) Applicant: KONICA MINOLTA, INC., Chiyoda-ku, Tokyo (JP)

(72) Inventor: Minoru Asakawa, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/509,908

(22) Filed: Oct. 8, 2014

(65) Prior Publication Data

US 2015/0098101 A1    Apr. 9, 2015

(30) Foreign Application Priority Data

Oct. 9, 2013   (JP) .................................. 2013-211681

(51) Int. Cl.
 G06K 15/00   (2006.01)

(52) U.S. Cl.
 CPC ..................................... *G06K 15/404* (2013.01)

(58) Field of Classification Search
 None
 See application file for complete search history.

(56) References Cited

U.S. PATENT DOCUMENTS

| 2006/0092453 A1* | 5/2006 | Okada et al. ................. 358/1.14 |
| 2008/0150228 A1* | 6/2008 | Terao ............................. 271/286 |
| 2008/0260413 A1* | 10/2008 | Kimura ........................... 399/82 |
| 2009/0279119 A1* | 11/2009 | Gerega ......................... 358/1.15 |

FOREIGN PATENT DOCUMENTS

| JP | 2005005943 A | 1/2005 |
| JP | 2006042303 A | 2/2006 |
| JP | 2007028105 A | 2/2007 |
| JP | 2007194726 A | 8/2007 |
| JP | 2011020277 A | 2/2011 |

OTHER PUBLICATIONS

Japanese Office Action (and English translation thereof) dated Jul. 28, 2015, issued in counterpart Japanese Application No. 2013-211681 X.

* cited by examiner

*Primary Examiner* — Thomas D Lee
(74) *Attorney, Agent, or Firm* — Holtz, Holtz, Goodman & Chick PC

(57) ABSTRACT

Provided is an image forming system including: an image forming section which forms images on sheets; a post-processing device which executes post-processing on the sheets on which the images are formed on the image forming section; and a controller which controls the image forming apparatus and the post-processing device, wherein the image forming section forms the images on the sheets in a state corresponding to the post-processing as a trial print with respect to a job for which the post-processing is designated, and the post-processing device ejects the sheets in a state that the post-processing is not completed on the sheets on which the images are formed.

18 Claims, 10 Drawing Sheets

IMAGE FORMING SYSTEM AND IMAGE FORMING SYSTEM CONTROL METHOD FOR CONTROLLING IMAGE FORMING CONDITIONS OF A JOB IN ACCORDANCE WITH A DESIGNATED POST-PROCESSING

This application claims priority based on the Paris Convention, in accordance with the U.S. Patent Law §119, of Japanese Patent Application No. 2013-211681 filed on Oct. 9, 2013.

BACKGROUND OF THE INVENTION

1. Field of the Invention

The present invention relates to an image forming system to which a post-processing device for executing sheet processing is connected, and relates to an image forming system control method for controlling such image forming system.

2. Description of Related Art

There is an image forming system in which a post-processing device is connected at the subsequent stage of the image forming apparatus. In the image forming system, a sheet bundle on which images are formed is subjected to saddle stitching bookbinding or gluing bookbinding, and a booklet in book form is output.

Such image forming apparatus also has a function for confirming, which function is referred to as trial print. By using the trial print, it is possible to output a copy of booklet which is in the same state as a booklet in a completed form. These technologies are described in Japanese Laid-Open Patent Application Publication Nos. 2005-5943 and 2007-28105.

The above Japanese Laid-Open Patent Application Publication No. 2005-5943 proposes that it is possible to arbitrarily set which ejection tray to use as an output destination when a trial print is executed on an image forming apparatus. However, in this proposal in Patent Document 1, the output destination for the sheets printed on the image forming apparatus are only switched, but Patent Document 1 does not consider at all in the case that a post-processing device is connected to the image forming apparatus.

In addition, the above Japanese Laid-Open Patent Application Publication No. 2007-28105 proposes to apply, when executing the trial print of the print job, print conditions which are dedicated to the trial print of the print job and which are different from print conditions designated for the print job. Here, if the trial print has processing conditions different from the processing conditions for an actual job, media or image conditions for the trial print are modified to make the trial print similar to an actual booklet.

Note that in an image forming system including a post-processing device, with respect to a print job for which a post-processing is designated, the control of the image forming system and the prohibited conditions are controlled while the following conditions are associated with structural conditions and processing functions of the post-processing device: a page order of sheets conveyed on each apparatus and device, an arrangement of images on a sheet (the positions of images, the order of images, and the direction of images), designated sheet size, a sheet number of bundle (number of sheets for one booklet), and the like.

In making booklets on the post-processing device, adjustment parameters for a plurality of booklets are held. Thus, in order to make a high quality booklet, a booklet is first output by the trial print to confirm the state of the booklet and to modify the adjustment parameters, and after a satisfactory state is confirmed, an actual printing is executed.

As adjustment parameters needed for making booklets on the post-processing device, there are parameters A and B as below.

Parameters A: Parameters A are parameters to make booklets and include sheet size information, sheet thickness information used to determine a bending width, and the like.

Parameters B: Parameters B are parameters related to showing of booklets and include a binding position, a cutting amount, an image state on page, and the like.

Regarding parameters A above, the post-processing device is input with adjustment parameters based on data obtained by measuring the sheet before the execution of the post-processing. Concretely speaking, data are transferred and received from the image forming apparatus to the post-processing device through communication, or the data are manually input into the post-processing device by an operator.

Further, regarding parameters B above, the operator confirms the showing of the booklet made by the trial print, and the operator inputs or modifies adjustment parameters in the post-processing device.

Here, if the image forming apparatus has a measurement function and the image forming apparatus and the post-processing device are configured so that various parameters can be transferred and received, parameters A above can be automatically input. However, if the image forming apparatus does not have the measurement function, parameters A above cannot be automatically input, and the operator has to input the parameters in the post-processing device. Alternatively, the image forming apparatus and the post-processing device can transfer and receive basic data such as ready and busy, but do not fully support the transfer and reception of various parameters, parameters A above cannot be automatically input, and the operator have to input parameters in the post-processing device.

On the other hand, in the case of a job for which post-processing such as making a booklet is designated, there sometimes arises a need to confirm a cutting amount and an image state on page, based not on a completed booklet but on the sheets before bookbinding. This need arises, for example, when the operator would like to confirm the state which is difficult to visually check on a completed booklet.

Alternatively, if it matters that you have to wait for a waiting time of a glue heating time in gluing bookbinding only for a copy of a trial print, there arises a need to confirm the state of the post-processing, based on the state of an uncompleted sheet bundle, without producing a final booklet. In a similar way, if there is a need that you do not want to use, for trial print, consumable materials such as glue for biding and staples for staplers, there arises a need to confirm the state of the post-processing, based on the state of an uncompleted sheet bundle, without producing a final booklet.

Here, in a job for which post-processing is designated, image formation is also executed to be in the state corresponding to the post-processing, on the premise that the post-processing is executed. "The state corresponding to the post-processing" above means the above-mentioned page order of sheets, the arrangement of images on a sheet (positions of images, an order of images, and a direction of images), and the like, and means the state suitable for executing post-processing. Therefore, if the designation of the post-processing is removed from the job in order to output with no post-processing, the image formation is executed in a state which is not corresponding to the post-processing.

Note that it is very troublesome and not practical for the operator to input, in the image forming apparatus, the settings for one copy of a trial print for which post-processing is not designated, in the same way as for a trial print on which the post-processing is to be executed. Therefore, it is impossible to deal with the above object that it is required to confirm the state of the post-processing, based on the state of an uncompleted sheet bundle, without making a final booklet, which is a problem.

SUMMARY OF THE INVENTION

The present invention has been made in view of such issues, and an object of the present invention is to realize an image forming system and an image forming system control method in which it is possible to accurately confirm a state of post-processing, based on a state of an uncompleted sheet bundle without completing a final booklet.

(1) An aspect which solves the above object is an image forming system or an image forming system control method for controlling the image forming system, and the system including: an image forming apparatus which forms images on sheets; a post-processing device which executes post-processing on the sheets on which the images are formed on the image forming apparatus; and a controller which controls the image forming apparatus and the post-processing device, wherein the controller controls such that the image forming apparatus forms the images on the sheets in a state corresponding to the post-processing as a trial print with respect to a job for which the post-processing is designated, and such that the post-processing device ejects the sheets in a state that the post-processing is not completed on the sheets on which the images are formed.

(2) In above (1), the controller controls such that the sheets on which the post-processing is not completed are output as a copy of a sheet bundle including a first page to a last page, corresponding to the job.

(3) In above (1) or (2), the image forming system includes an ejection switching section which performs switching when ejecting the sheets, and wherein the controller controls the ejection switching section such that, when the sheets are ejected, the sheets are ejected in different states between the trial print and a print other than the trial print.

(4) In above (3), the image forming system includes a plurality of ejection sections to which the sheets are ejected, and the controller controls the ejection switching section such that the sheets are ejected to different ejection sections as the different states.

(5) In above (3), the image forming system includes at least an ejection section to which the sheets are ejected, and the controller controls the ejection switching section such that the sheets are ejected to the same ejection section at different positions as the different states.

(6) In above (1) to (5), the controller controls the image forming apparatus such that conveyance of the sheets on the image forming apparatus, positions of the images formed on the sheets, and an order of forming the images satisfy predetermined conditions specified for the designated post-processing.

(7) In above (3) to (6), the controller identifies the post-processing device connected to the image forming apparatus, and controls the ejection switching section to switch, corresponding to the identified post-processing device.

(8) In above (1) to (7), the controller identifies the post-processing device connected to the image forming apparatus, and controls switching of the ejection switching section to switch to a predetermined ejection section, corresponding to the identified post-processing device.

(9) In above (1) to (8), the controller selectively controls, with respect to the job for which post-processing is designated, such that only a part of the post-processing is executed on the sheets so as to put the sheets in an in-process state, or such that the sheets are put in a state that no post-processing is executed on the sheets, as the state that the post-processing is not completed on the post-processing device.

(10) In above (1) to (9), the controller selectively controls, with respect to the job for which post-processing is designated, such that the sheets are ejected in the state that the post-processing is not completed, or such that the sheets are subjected to the post-processing and are ejected in a completed state.

DETAILED DESCRIPTION OF THE PREFERRED EMBODIMENT

Hereinafter, an embodiment for carrying out the present invention (hereinafter, referred to as an "embodiment") will be described in detail with reference to the drawings.

<Configuration>

Figure 1:
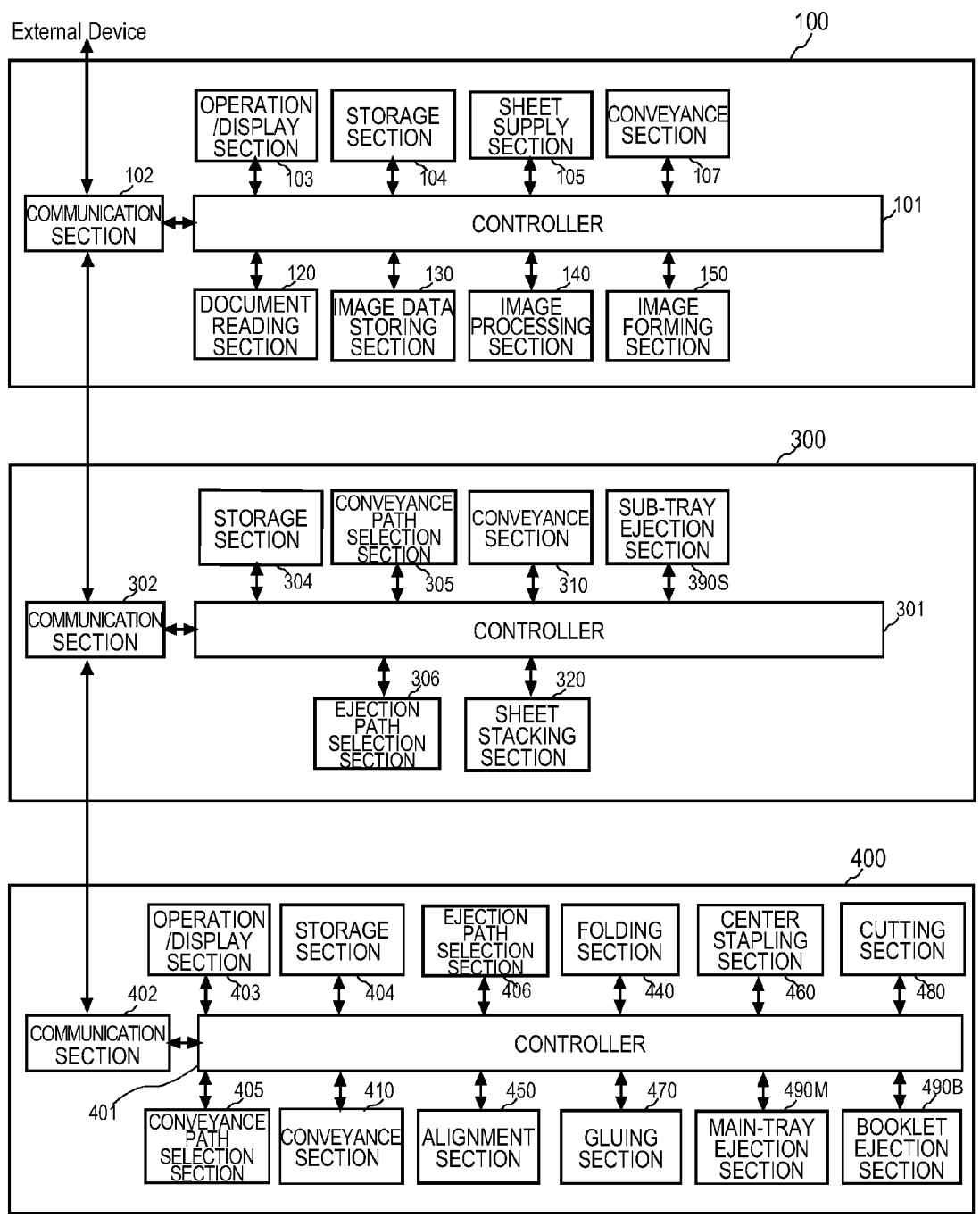
FIG. 1 is a block diagram showing a configuration of an image forming system of an embodiment of the present invention.
Figure 2:
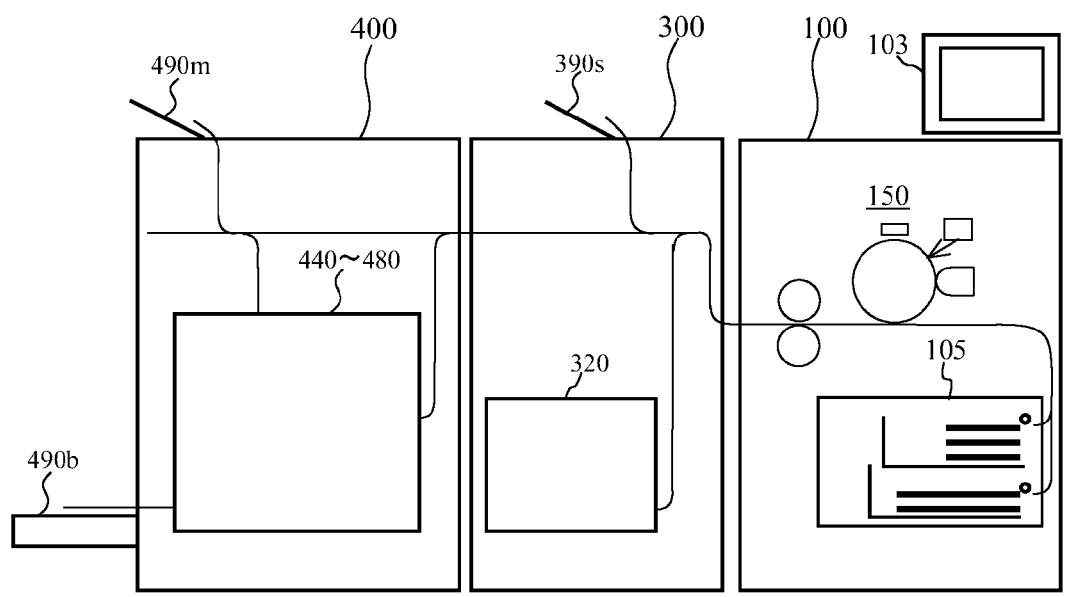
FIG. 2 a configuration diagram showing a configuration of an image forming system of an embodiment of the present invention.

With reference to FIG. 1 and FIG. 2, there will be described an image forming apparatus according to the present embodiment and a configuration of an image forming system equipped with a post-processing device As shown in FIG. 1 and FIG. 2, the image forming system has an image forming apparatus 100, a post-processing device 300 provided on a subsequent stage of the image forming apparatus 100 and equipped with a sheet ejection function and a sheet stacking function, and a post-processing device 400 equipped with a sheet processing function.

Note that the disclosed connection between the devices in the image forming system is just an example and is not restrictive. The image forming apparatus 100 is equipped with: a controller 101 which controls various parts in the image forming apparatus 100 and controls the whole system as a post-processing device; a communication section 102 for communicating with other devices connected thereto; an operation/display section 103 which informs the controller 101 of an operation input signal corresponding to an operation input by a user and display a state of the image forming apparatus 100; a storage section 104 which stores a control program and various setting data and is used as a working area for the control program; a sheet supply section 105 which supplies stored sheets; a conveyance section 107 which conveys, at a predetermined speed, the sheets which are supplied and then get images formed thereon; a document reading section 120 which scans a document to generate image data; an image data storing section 130 which stores image data for image forming and various data; an image processing section 140 which executes various types of image processing required for image formation; and an image forming section 150 which executes image formation (representing a series of operations including formation of image, transfer, fixing, and the like, and generally referred to as "image formation"), based on an image formation instruction and image data after image processing. Note that, the sheets on which images are formed on the image forming apparatus 100 are carried out toward a post-processing device 300 on the subsequent stage.

The post-processing device 300 is connected to the image forming apparatus 100 on a subsequent stage thereof and is equipped with a controller 301 which controls various parts in the post-processing device 300; a communication section 302 for communicating with the image forming apparatus 100; a storage section 304 which stores a control program and various setting data and is used as a working area for the control program; a conveyance path selection section 305 which selects a conveyance path for conveying sheets; an ejection path selection section 306 which selects an ejection path through which a sheet bundle which has been subjected to sheet processing is ejected; a conveyance section 310 which conveys sheets at a predetermined speed; a sheet stacking section 320 which stacks sheets to be ejected on a stacker; and a sub-tray ejection section 390S which ejects sheets to be ejected to sub-tray 390s. Note that the sheets conveyed in the post-processing device 300 are carried out toward the post-processing device 400 on the subsequent stage.

The post-processing device 400 is connected to the post-processing device 300 on a subsequent stage thereof and is equipped with: a controller 401 which controls various parts in the post-processing device 400; a communication section 402 for communicating with the image forming apparatus 100, the post-processing device 300, and the like; an operation/display section 403 which informs the controller 401 of an operation input signal corresponding to an operation input by a user and display a state of the post-processing device 400; a storage section 404 which stores a control program and various setting data and is used as a working area for the control program; a conveyance path selection section 405 which selects a conveyance path for conveying sheets; an ejection path selection section 406 which selects an ejection path through which a sheet bundle which has been subjected to sheet processing is ejected; a conveyance section 410 which conveys sheets at a predetermined speed; a folding section 440 which center-folds or three-folds sheets; an alignment section 450 which aligns a plurality of folded sheets; a center stapling section 460 which binds the folded and aligned sheet bundle for saddle stitching; a gluing section 470 which glues the aligned sheet bundle for gluing bookbinding; a cutting section 480 which cut off an edge part of the saddle-stitched sheet bundle; a main-tray ejection section 490M which ejects sheets and a booklet by using a main-tray 490m as an ejection destination; and a booklet ejection section 490B which ejects a booklet by using a booklet ejection tray 490b as the ejection destination. Note that the configuration diagram of FIG. 2 shows the folding section 440, the alignment section 450, the center stapling section 460, the gluing section 470, and the cutting section 480 in a gathered state.

Figure 3:
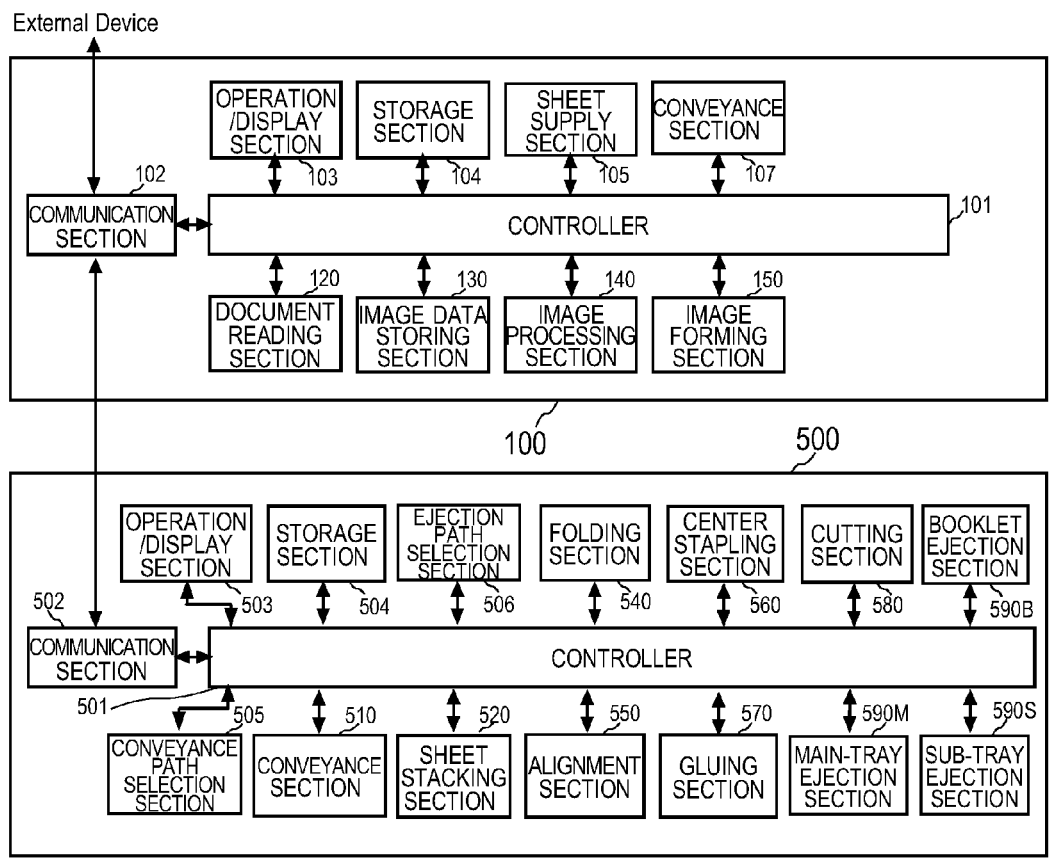
FIG. 3 is a block diagram showing a configuration of the image forming system of the embodiment of the present invention.
Figure 4:
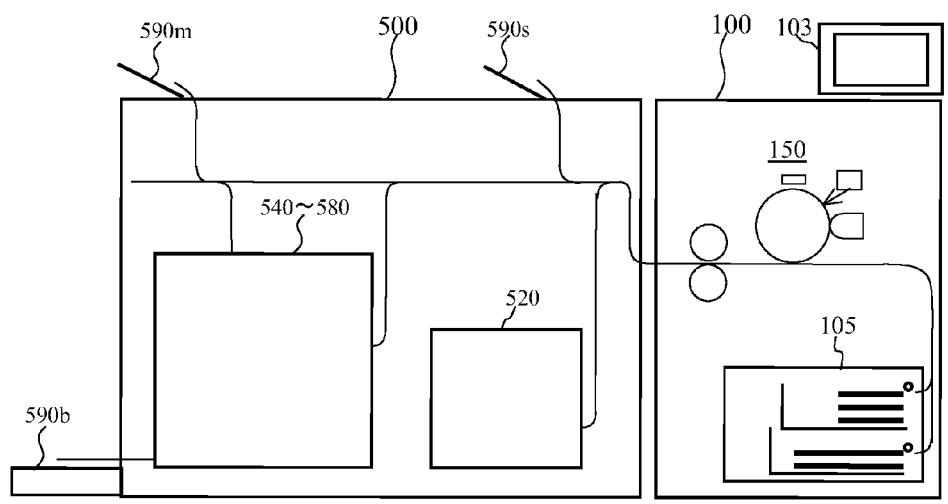
FIG. 4 a configuration diagram showing a configuration of the image forming system of the embodiment of the present invention.

In the above configuration, the ejection path selection sections 306 and 406 operate as ejection switching sections which perform switching when sheet are ejected. In the image forming system shown in FIG. 1 and FIG. 2, the post-processing device 300 and the post-processing device 400 may be configured to be a post-processing device 500 as shown in FIG. 3 and FIG. 4. In the post-processing device 500 shown in FIG. 3 and FIG. 4, the components 301, 302, 304, 305, 306, 309S, 310, and 320 in the post-processing device 300 correspond to the component 501, 502, 504, 505, 506, 509S, 510, and 520 in the post-processing device 500, respectively. The components 401, 402, 403, 404, 405, 406, 410, 440, 450, 460, 470, 480, and 490M in the post-processing device 400 corresponds to component 501, 502, 503, 504, 505, 506, 510, 540, 550, 560, 570, 580, and 590M in the post-processing device 500, respectively. Thus, the duplicated components are not described again.

Note that the sheet processing functions and the components in the above post-processing devices 300, 400, and 500 are just examples, and are not restrictive. For example, three or more post-processing devices may be connected.

<Operation of the Embodiment>

Figure 6:
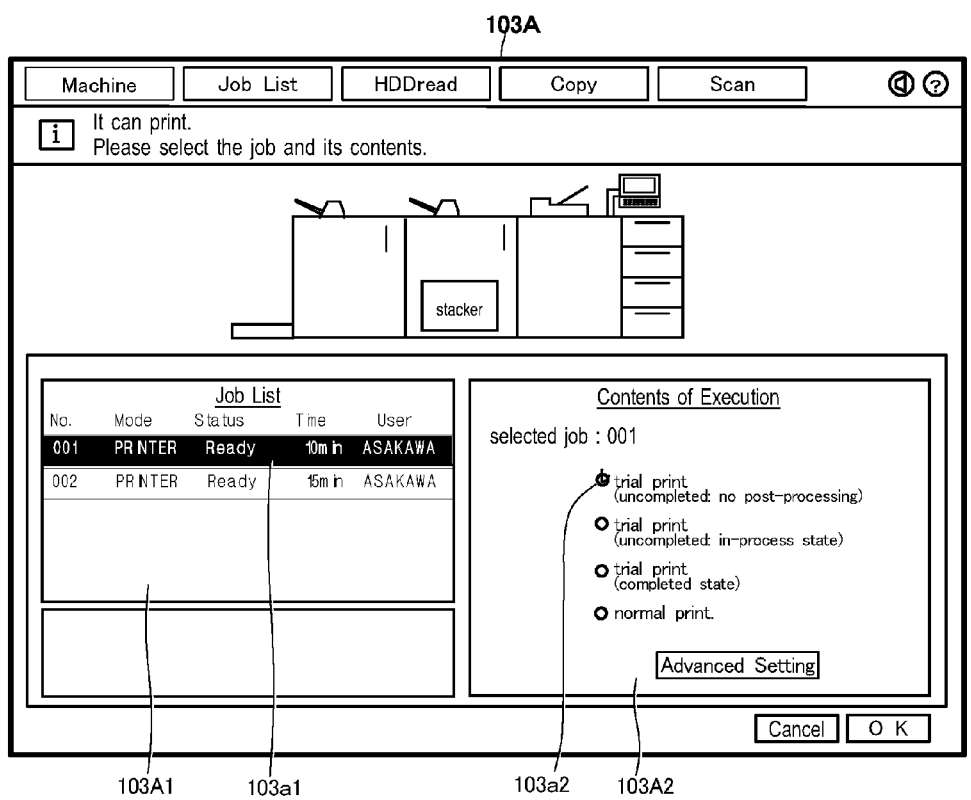
FIG. 6 is an explanatory diagram showing an exemplary display screen when image formation of the embodiment of the present invention is operated.
Figure 7:
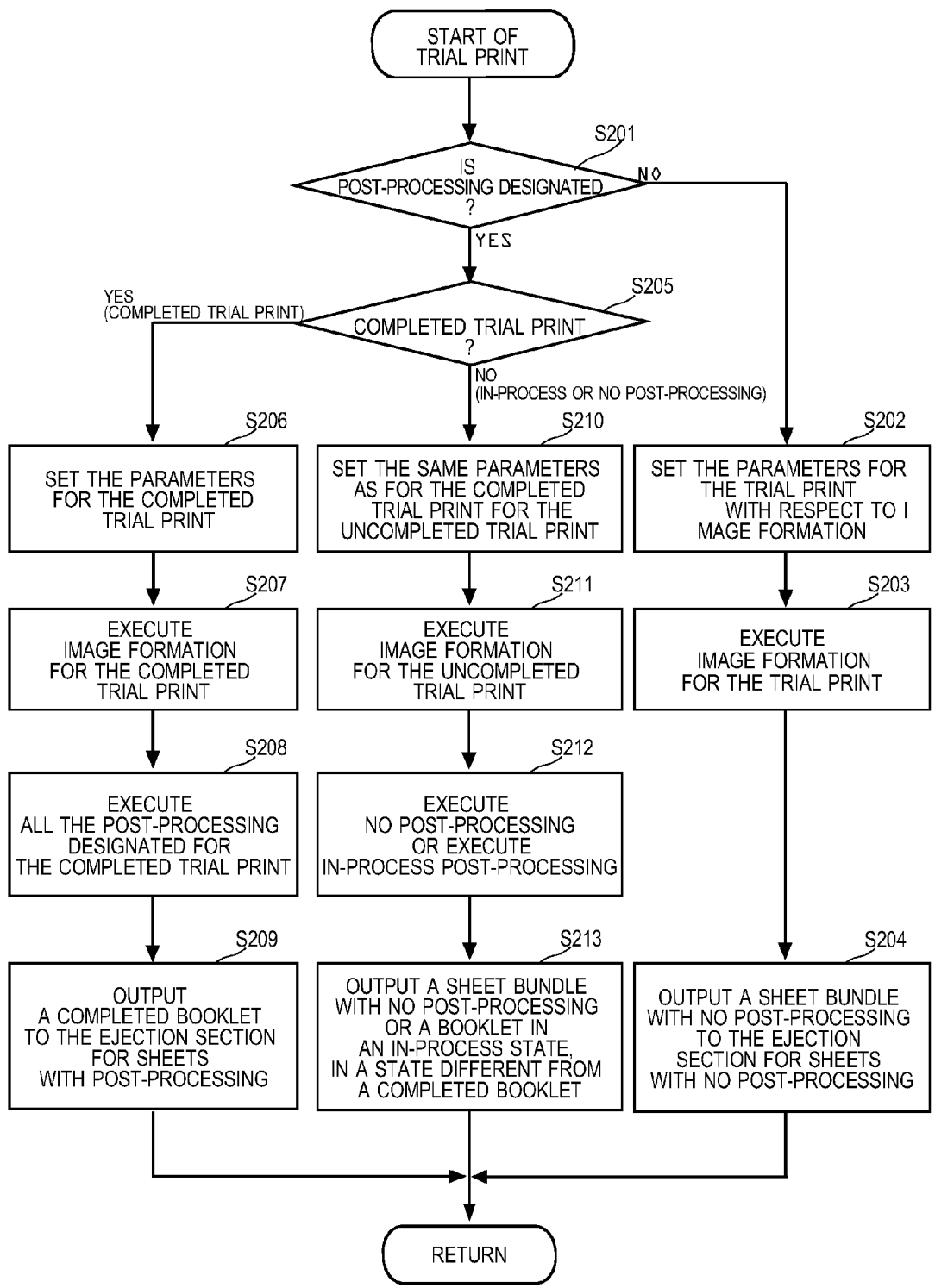
FIG. 7 is a flowchart of an operation of image formation of the embodiment of the present invention.

Hereinafter, the image forming system, the post-processing device, and the image forming system control method of the present embodiment will be described, following the operation procedure, with reference to a flowchart of a whole operation (FIG. 5), an explanatory diagram of a display screen (FIG. 6), and a flowchart of a detailed operation (FIG. 7). Note that the image forming system of FIG. 1 and FIG. 2 is used as a specific example of the configuration.

<Whole Operation of the Embodiment>

Figure 5:
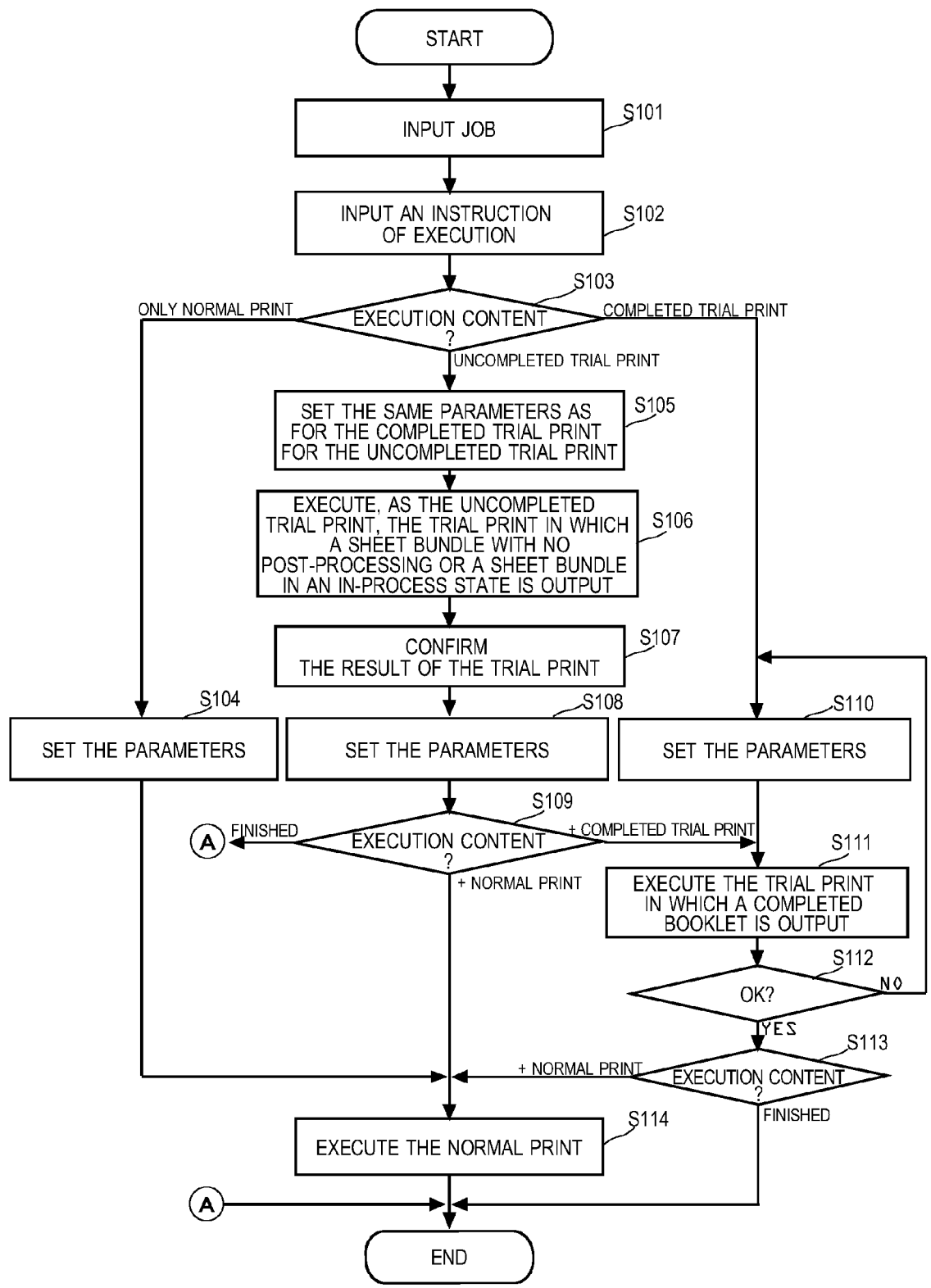
FIG. 5 is a flowchart showing an operation of image formation of the embodiment of the present invention.

FIG. 5 is a flowchart illustrating a main routine as a basic operation of the image forming system of the present embodiment.

In the following description, in the case that the controller 301 receives instructions from the controller 101 and controls the various parts in the post-processing device 300 and also in the case that the controller 401 receives instructions from the controller 101 and controls the various parts in the post-processing device 400, the description will be made assuming that those controls are executed by the controller 101.

With respect to a job of image formation to which post-processing such as producing a booklet is designated or no post-processing is designated, job data having image data and control data are entered from an external device into the image forming apparatus 100 via the communication section 102 (FIG. 5: step S101).

The job data are stored in the image data storing section 130 under the control of the controller 101. Here, the job represents a series of operations related to image formation. For example, when sheets are output with plural pages of images formed on the sheets, a series of operations related to forming the plural pages of images is one job. Alternatively, when plural pages of images are formed on sheets and the sheets are output after being post-processed, a series of operations related to forming the plural pages of image and the post-processing is one job. In the present embodiment, the specific example is a job of image formation to which post-processing is designated.

Then, the operator selects, through an operation section 103 or an external device, a job to be executed from the jobs stored in the image data storing section 130, and the operator input an instruction of execution (FIG. 5: step S102). Note that, at this time, the operator may input settings about the image formation and the post-processing from the operation/display section 103.

Here, the instruction of execution of the job is one or more of "execution of normal print," "execution of a completed trial print," and "execution of an uncompleted trial print." "Execution of normal print" represents outputting of a printed matter in, for example, booklet form of a printed matter in the intended form of completion, by executing image formation and post-processing.

"Execution of a completed trial print" represents outputting a printed matter in the intended form of completion, for example, a printed matter in booklet form as a trial print, by executing the designated image formation and post-processing. Note that the number of output copies of the trial print is not counted in the number of output copies of the execution of normal print.

"Execution of an uncompleted trial print" is a process to be uniquely executed in the present embodiment and represents outputting a printed matter in sheet bundle form just before a completed printed matter as a trial print, by not completing the post-processing (in a state that the post-processing is not executed at all, or in a state that only a part of the post-processing is executed) but executing the image formation (or, the image formation and a part of the post-processing) in the same control conditions as the case that the post-processing is completely executed, with respect to the designated image formation and post-processing.

Note that the number of output copies of the trial print is not counted in the number of output copies of the execution of normal print. The part of post-processing represents the case that, when a saddle stitching bookbinding process is designated, alignment and bending processes are executed but stapling is not executed, or the case that, when a gluing bookbinding process is designated, the aligned sheet bundle is not glued.

FIG. 6 is an example of a display screen 103A displayed on the operation/display section 103, when a job is selected to be executed and the content of the execution is instructed. On the display screen 103A, in the lower left job list column 103A1, there are displayed executable jobs in list form. Here, the job having the job number 001 is selected and highlighted (reference numeral 103a1 of FIG. 6).

Also on the display screen 103A, in a lower right execution content column 103A2, there is displayed contents of execution of the job to be executed in a selectable state. Here, the trial print (uncompleted: state of no post-processing executed) is selected and check-marked (reference numeral 103a2) out of the four states: the trial print (uncompleted: state of no post-processing executed), the trial print (uncompleted: in-process state), the trial print (completed state), and the normal print.

On the display screen of FIG. 6, the tab of "Advanced Setting" can be pressed to set an execution content of the job. Alternatively, on the display screen of FIG. 6, it is possible to selects plural items out of the four item: the trial print (uncompleted: state of no post-processing executed), the trial print (uncompleted: in-process state), the trial print (completed state), and the normal print. When plural items are selected, the selected items are executed in the order of, for example, the trial print (uncompleted: state of no post-processing executed), the trial print (uncompleted: in-process state), the trial print (completed state), and the normal print.

The display screen 103 may be a screen on which the operator can right-click the job having the job number 001 (reference numeral 103a1 of FIG. 6) by using a pointing device so that the execution content column 103A2 is displayed in a pop-up window.

First, the controller 101 identifies the execution content of the job instructed by the operator (FIG. 5: step S103). By the identification in step S103, the execution content of the job is sorted into the followings: a job including an uncompleted trial print (only uncompleted trial print, uncompleted trial print+completed trial print, uncompleted trial print+normal print, uncompleted trial print+completed trial print+normal print), a job including a completed trial print (only trial print, completed trial print+normal print), a job including only a normal print. Then, after execution of uncompleted trial print and a completed trial print, it is determined whether there is an instruction which is not yet executed.

When the identification of the execution content of the job instructed by the operator (FIG. 5: step S103) shows that only the execution of normal print is instructed (FIG. 5, step S103: ONLY NORMAL PRINT), the controller 101 controls such that the various parts of the image forming apparatus 100 and the post-processing devices 300-400 are set by using parameters extracted from the control data contained in the job data (FIG. 5: step S104), and such that the predetermined number of copies of the normal print is executed by executing the predetermined post-processing on the post-processing devices 300-400 on the sheets on which images have been formed on the image forming apparatus 100 (FIG. 5: step S114).

When the identification of the instruction of execution from the operator (FIG. 5: step S102) shows that the execution content of the job includes the execution of an uncompleted trial print (FIG. 5, step S103: UNCOMPLETED TRIAL PRINT), the controller 101 does not complete, with respect to the image formation and the post-processing for the job which is instructed to be executed, the post-processing (a state of no post-processing executed, or a state of a part of the post-processing executed), but the controller 101 sets the image forming apparatus 100 and the parts in the post-processing devices 300-400 related to the post-processing which is to be partially executed, by using the parameters (parameters of the same control conditions as in the case that all the post-processing is to be executed) extracted from the control data contained in the job data (FIG. 5: step S105).

Then, the controller 101 sets the parameters of the same control conditions as in the case that all the post-processing is to be executed; and in this state, the controller 101 executes, with respect to the image formation and the post-processing for the job which is instructed to be executed, (1) an uncompleted trial print with no post-processing by forming images on the sheets on the image forming apparatus 100, or (2) an uncompleted trial print in an in-process state by forming images on the sheets on the image forming apparatus 100 and by executing a part of the post-processing on the post-processing device 400 (FIG. 5: step S106). By executing the uncompleted trial print as described above, a copy of a sheet bundle having the first page to the last page is output with no post-processing, or a copy of a booklet having the first page to the last page is output with a part of the post-processing executed.

Because the controller 101 controls, with respect to such sheet bundle and booklet by the uncompleted trial print, the conveyance path and the ejection path so that the uncompleted trial print is ejected in a state different from the ejection destination for the normal print, it is easy for the operator to accurately confirm the state of the post-processing from the sheet bundle and the booklet by the uncompleted trial print.

For example, in the case that the ejection destination for the normal print is the booklet ejection tray 490b, the controller 101 controls so that a sheet bundle with no post-processing, which is an output of the uncompleted trial print, is ejected to the sub-tray 390s, which is different from the booklet ejection tray 490b. Alternately, in the case that the ejection destination for the normal print is the booklet ejection tray 490b, the controller 101 controls so that a booklet in an in-process state, which is an output of the uncompleted trial print, is ejected to the same booklet ejection tray 490b but in the state that the booklet is shifted in a direction perpendicular to the ejecting direction, by using an ejection switching section (not shown) which switches the state of ejection when ejecting sheets to the same ejection section.

However, in the case that a sheet bundle by the uncompleted trial print and a booklet by the normal print are not successively output, a sheet bundle and a booklet by the trial print can be output to the booklet ejection tray 490b without the shift described above.

The operator confirms, based on the sheet bundle with no post-processing and the booklet in an in-process state with a part of the post-processing executed, basic parameters for producing a booklet such as sheet size information for alignment and sheet thickness information for determining a bending width, and confirms image positions on the sheets (FIG. 5: step S107).

By the above process, it is possible to confirm a state which is difficult to check in the form of a completed booklet, to meet the requirement of the operator that the operator wants to confirm a cutting amount and an image state on page on the sheets before becoming a booklet instead of on the completed booklet, with respect to a job to which post-processing such as making a booklet is designated.

Thus, without generating a waiting time for a glue heating time for gluing bookbinding for only one copy of the trial print, without need of using consumable material such as glue for binding or staples for stapling, and without completing a final booklet, it is possible to confirm a state of post-processing from an uncompleted sheet bundle.

Further, different from a sheet bundle in which a job to which post-processing is designated is printed with the designated post-processing removed, the uncompleted trial print is executed in the state that the parameters of the same control conditions as in the case that all the post-processing is to be executed is set; thus, a sheet bundle or a booklet accurately reproducing the state just before execution of post-processing, whereby it is possible to confirm the state of post-processing from the state of an uncompleted sheet bundle, without making a final booklet.

Then, the operator confirms the sheet bundle and the booklet by the uncompleted trial print, and if the parameters such as the sheet size information and the sheet thickness information are obtained, the parameters are input from the operation/display section 403 to perform necessary setting (FIG. 5: step S108).

Here, the controller 101 identifies the execution content of the job instructed by the operator (FIG. 5: step S109), if the instruction of execution (FIG. 5: step S102) from the operator is only the execution of the uncompleted trial print, because the process which is instructed to be executed has been completed (FIG. 5, step S109: FINISHED), the controller 101 finishes the series of operations (FIG. 5: END).

If the instruction of execution from the operator (FIG. 5: step S102) is the execution of the uncompleted trial print and the normal print, because the process of the uncompleted trial print which is instructed to be executed has been completed (FIG. 5, step S109: +NORMAL PRINT), the controller 101 controls so that a predetermined number of copies of the normal print is executed by executing a predetermined post-processing on the post-processing devices 300-400 on the sheets on which images have been formed on the image forming apparatus 100 (FIG. 5: step S114).

If the instruction of execution from the operator (FIG. 5: step S102) is the execution of the uncompleted trial print and the completed trial print (FIG. 5, step S109: +COMPLETED TRIAL PRINT), because the process of the uncompleted trial print which is instructed to be executed has been completed, the controller 101 executes the completed trial print (FIG. 5: step S111). By executing the completed trial print as described above, the designated image formation and post-processing are executed; thus, a printed matter in the intended form of completion, for example, a printed matter in booklet form is output as the trial print.

Based on the completed trial print, the operator confirms showing of the booklet produced by the completed trial print (FIG. 5: step S112). If the operator determines that there is no problem with the showing of the booklet produced by the completed trial print (FIG. 5, step S112: YES), the controller 101 checks the execution content of the job instructed by the operator (FIG. 5: step S113). Note that a description will be made later about the case that the operator determines that there is a problem (FIG. 5, step S112: NO).

In the case that it is determined that there is no problem with the completed trial print (FIG. 5: step S112: YES), if the instruction of execution from the operator (FIG. 5: step S102) is "uncompleted trial print+completed trial print" or "only a trial print", because the process which is instructed to be executed has been completed (FIG. 5, step S113: FINISHED), the controller 101 finishes the series of operations (FIG. 5: END).

If the instruction of execution from the operator (FIG. 5: step S102) is the execution of the completed trial print and the normal print or the execution of the uncompleted trial print, because the completed trial print and the normal print, because the process of the uncompleted trial print and the process of the completed trial print which are instructed to be executed have been complete (FIG. 5, step S113: +NORMAL PRINT), the controller 101 controls so that a predetermined number of copies of the normal print is executed by executing predetermined post-processing on the post-processing devices 300-400 on the sheets on which images have been formed on the image forming apparatus 100 (FIG. 5: step S114).

If it is determined that the instruction of execution from the operator (FIG. 5: step S102) includes the execution of the completed trial print (FIG. 5: step S103: COMPLETED TRIAL PRINT), the controller 101 sets, by using the parameters extracted from the control data contained in the job data and the parameters automatically measured by the measurement section (not shown) in the image forming apparatus 100, the various parts of the image forming apparatus 100 and the post-processing devices 300-400 (FIG. 5: step S110). Then, the controller 101 executes the completed trial print (FIG. 5: step S111) to execute the designated image formation and post-processing, thereby outputting a printed matter in an intended form of completion, for example, a printed matter in booklet form as the trial print.

The operator checks the showing of the booklet produced by the completed trial print (FIG. 5: step S112), and if the operator determines that there is a problem with the showing of the produced booklet (FIG. 5, step S112: NO), the operator corrects the parameters related to the showing of the booklet to be produced, for example, a binding position, the cutting amount, and an image state on page, on the operation/display section 103 or on the operation/display section 403 (FIG. 5: step S110).

Hereinafter, until the operator determines, by checking the completed trial print, that there is no problem (FIG. 5, step S112: YES), the following processes are repeated: the execution of a completed trial print (FIG. 5: step S111); the checking of the completed trial print by the operator (FIG. 5: step S112); and the setting of the parameters by the operator (FIG. 5: step S110).

If it is determined that there is no problem with the completed trial print (FIG. 5, step S112: YES), the controller 101 controls, as already described, so that the normal print is executed or the process is finished, based on the instruction of execution from the operator (FIG. 5: step S102).

<Detailed Operation of the Embodiment>

FIG. 7 is a flowchart showing the detailed operation of the trial print on the image forming system of the present embodiment.

When the process of the trial print is executed, the controller 101 determines whether the job for which the trial print is to be executed is in combination with post-processing (FIG. 7: step S201). If the job is not in combination with post-processing (FIG. 7, step S201: NO), the controller 101 sets, with respect to the image formation of the job which is instructed to be executed, the image forming apparatus 100, by using the parameters (parameters of the same control conditions as in the case of execution of normal image formation) which is extracted from the control data of the job data (FIG. 7: step S202). Then, the controller 101 executes image formation as the trial print on the image forming apparatus 100 (FIG. 7: step S203), and ejects a sheet bundle on which images are formed to the ejection section for sheets with no post-processing (FIG. 7: step S204). In this case, stackers such as the sub-tray 390*s* and the sheet stacking section 320 correspond to the ejection section for sheets with no post-processing, for example.

If post-processing is designated for the job (FIG. 7, step S201: YES), the controller 101 determines whether the trial print to be executed is the completed trial print in which post-processing is completed or the uncompleted trial print in which post-processing is not completed (FIG. 7: step S205).

If it is determined that the job to be executed is the completed trial print (FIG. 7, step S205: YES), the controller 101 sets, with respect to the image formation and the post-processing of the job which is instructed to be executed, the image forming apparatus 100 and the post-processing devices 300-400, by using the parameters (parameters of the same control conditions as in the case of execution of normal image formation and post-processing) which is extracted from the control data contained in the job data (FIG. 7: step S206). Then, the controller 101 executes image formation as the completed trial print on the image forming apparatus 100 (FIG. 7: step S207), and executes, on the sheets on which images have been formed, all the post-processing designated as the completed trial print on the post-processing device 400 (FIG. 7: step S208). The controller 101 then outputs a completed booklet to the ejection section for sheets with post-processing (FIG. 7: step S209). In this case, the booklet ejection tray 490*b* corresponds to the ejection section for sheets with no post-processing, for example.

If it is determined that the job to be executed is the uncompleted trial print (FIG. 7, step S205: NO), the controller 101 sets, with respect to the image formation and the post-processing of the job which is instructed to be executed, the image forming apparatus 100 and the post-processing devices 300-400, by using the parameters (parameters of the same control conditions as in the case of execution of normal image formation and post-processing) which is extracted from the control data contained in the job data (FIG. 7: step S210). Then, the controller 101 executes image formation as the uncompleted trial print on the image forming apparatus 100 (FIG. 7: step S211). Further, the controller 101 controls so that the sheets on which images have been formed on the image forming apparatus 100 are made to be a sheet bundle with no post-processing or so that a part of the post-processing is executed, on the post-processing device 400, on the sheets on which images are formed on the image forming apparatus 100 to make the sheets a booklet in an in-process state (FIG. 7: step S212). Then, the controller 101 outputs the sheet bundle with no post-processing by the above-described uncompleted trial print or the booklet in an in-process state to the ejection section, in a state different from the state of a booklet by the completed trial print (FIG. 7: step S213). If the ejection destination for the normal print and the completed trial print is the booklet ejection tray 490*b*, the controller 101 controls so that the sheet bundle with no post-processing is ejected to the sub-tray 390*s* and so that the booklet in an in-process state is ejected to be shifted in a direction perpendicular to the ejecting direction on the booklet ejection tray 490*b*. Further, if a sheet bundle and a booklet on which a part of post-processing is executed can be ejected to the main-tray 490*m*, the controller 101 may control so that the booklet in an in-process state is ejected to the main-tray 490*m*.

<Exemplary Display Screens when Embodiment Operates>

Figure 8:
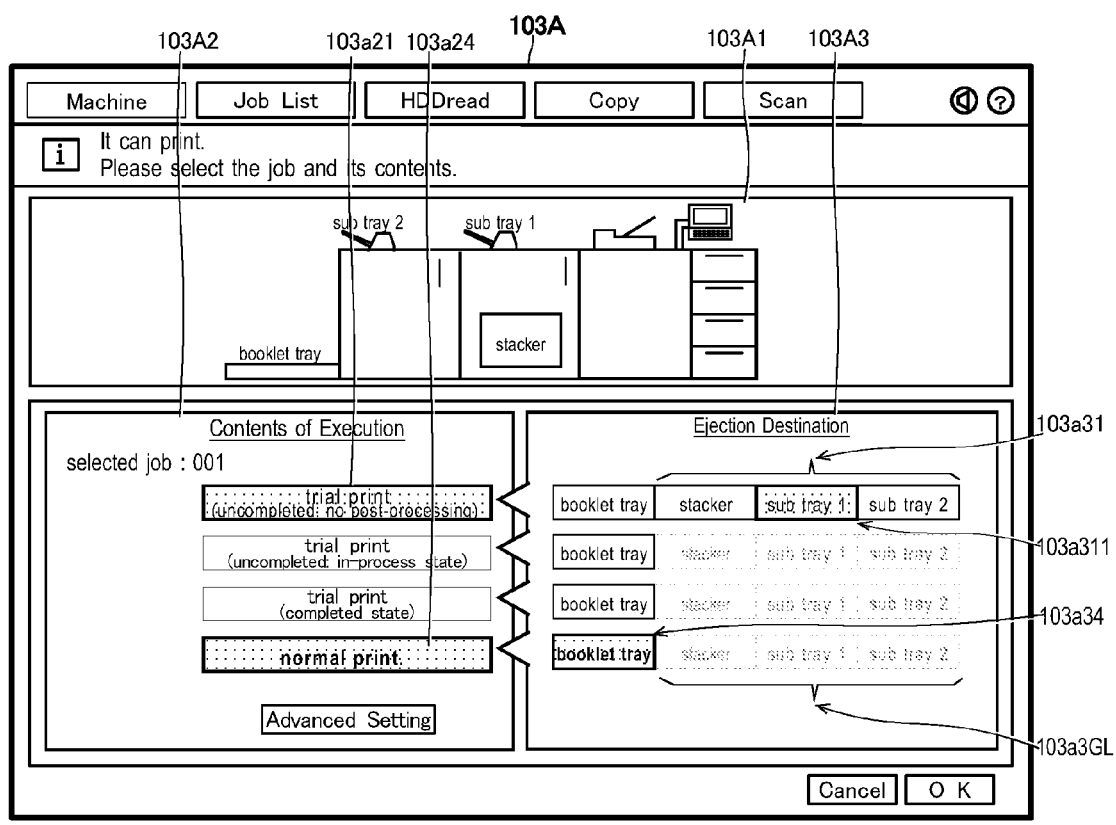
FIG. 8 is an explanatory diagram of an exemplary display screen when image formation of the embodiment of the present invention is operated.

FIG. 8 shows an example of the display screen 103A which shows a processing content of the job of the image forming system of the present embodiment and settings of ejection destinations.

The display screen 103A includes an ejection destination display section 103A1 graphically showing the ejection sections of the image forming system, an execution-content display section 103A2 showing an execution content of a selected job, and an ejection destination display section 103A3 showing the ejection destination of the selected job.

Here, the ejection destination display section 103A1 shows that the stacker, the sub-tray 1, the sub-tray 2, and a booklet tray are selectable as the ejection destination, and shows the outer view of the image forming system. Note that, the booklet ejection tray 490*b* is referred to as "the booklet tray" here.

Further, the execution-content display section 103A2 shows that the trial print (uncompleted, with no post-processing) 103*a*21 and the normal print (with post-processing) 103*a*24 are selectable jobs.

Further, only the booklet tray is the ejection destination for a printed matter with post-processing; however, because the trial print (uncompleted, with no post-processing) 103*a*21 as the selected job is the trial print with no post-processing, the Stacker, the sub-tray 1, and the sub-tray 2 are added as the option of the ejection destinations (FIG. 8, 103*a*31) on the ejection destination display section 103A3.

Further, the ejection destination which corresponds to the trial print (uncompleted, with no post-processing) 103*a*21 as the selected job may be selected by the operator; however, the ejection destination different from the booklet ejection tray which is the original ejection destination for a printed matter with post-processing may be previously set as an initial state. The example of FIG. 8 shows, the state that the sub-tray 1 is selected as the ejection destination which corresponds to the trial print (uncompleted, with no post-processing) 103*a*21 as the selected job (FIG. 8, 103*a*311).

In addition, in the case of the trial print (uncompleted: in-process state), the trial print (completed state), and the normal print (with post-processing), post-processing such as a bookbinding process is executed; thus, the booklet ejection tray as the original ejection destination is only valid, and other ejection destinations (the stacker, the sub-tray 1, and the sub-tray 2) are shown to be not selectable (invalid) (FIG. 8, 103*a*3GL: the stacker, the sub-tray 1, and the sub-tray 2 are grayed out). The example of FIG. 8 shows the state that the ejection destination which corresponds to the normal print (with post-processing) 103*a*24 as the selected job is the booklet tray (FIG. 8, 103*a*34).

Figure 9:
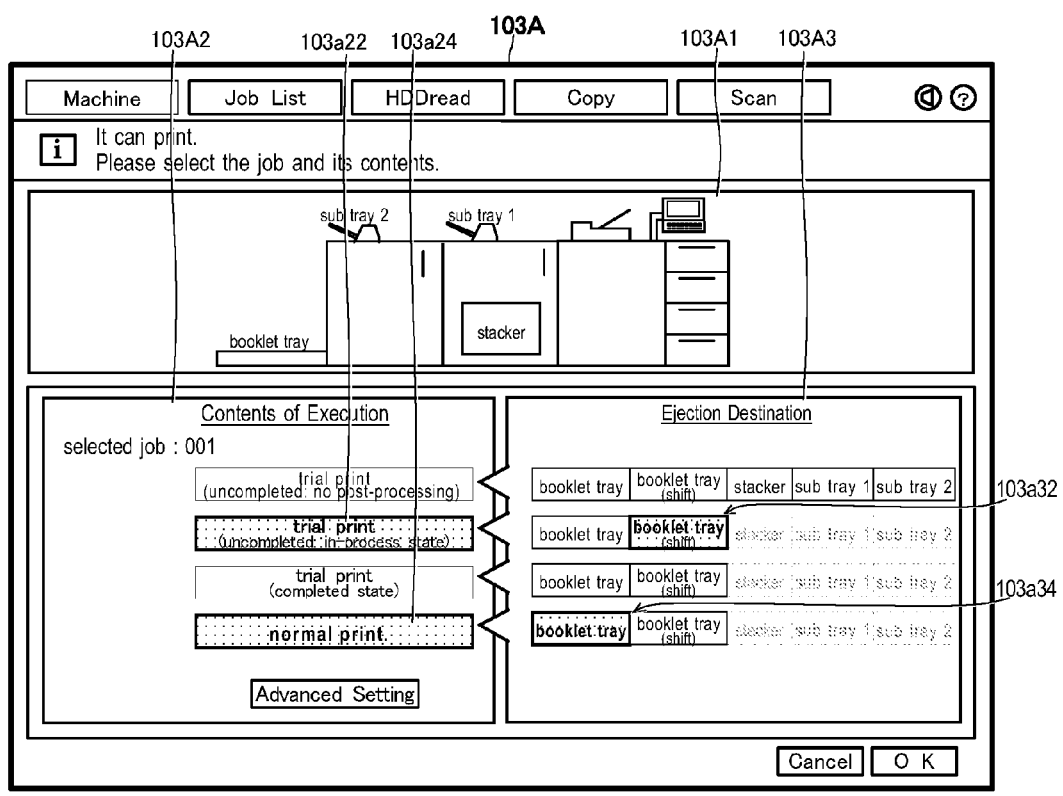
FIG. 9 is an explanatory diagram showing an exemplary display screen when image formation of the embodiment of the present invention is operated.

FIG. 9 shows another example of the display screen 103A showing processing contents of the job of the image forming system of the present embodiment and settings of ejection destinations. Because the basic parts of FIG. 9 are the same as those in FIG. 8, the duplicated parts are not described again.

For example, it is assumed that control is made such that the ejection switching section (not shown) or the like for switching so as to eject sheets to the booklet tray is used to shift the booklet in a direction perpendicular to the ejecting direction even on the same the booklet ejection tray 490*b*.

In this case, the ejection destination which corresponds to the trial print (uncompleted, in-process state) 103*a*22 as the selected job may be selected by the operator; however, the ejection destination different from the booklet ejection tray which is the original ejection destination for sheets with post-processing may be previously set as an initial state. The example of FIG. 9 shows the state that the booklet tray (shifted) is selected as the ejection destination which corresponds to the trial print (uncompleted, in-process state) 103*a*22 as the selected job (FIG. 9, 103*a*32). Further, the example of FIG. 9 shows the state that the ejection destination which corresponds to the normal print (with post-processing) 103*a*24 as the selected job is the booklet tray (FIG. 9, 103*a*34). With this operation, even when the trial print and the normal print are output on the same booklet tray, it is easy for the operator to confirm the state of the post-processing from the sheet bundle and the booklet from the uncompleted trial print.

However, in order to make such control, the controller 101 of the image forming apparatus 100 needs to identify the ejection switching section of the post-processing device 400 and needs to be able to control the ejection switching section. In addition, the post-processing device 400 also needs to have a mechanism which can eject a booklet or a sheet bundle in an in-process state (for example, in a center fold state just before the final saddle stitching) to the booklet tray.

Figure 10:
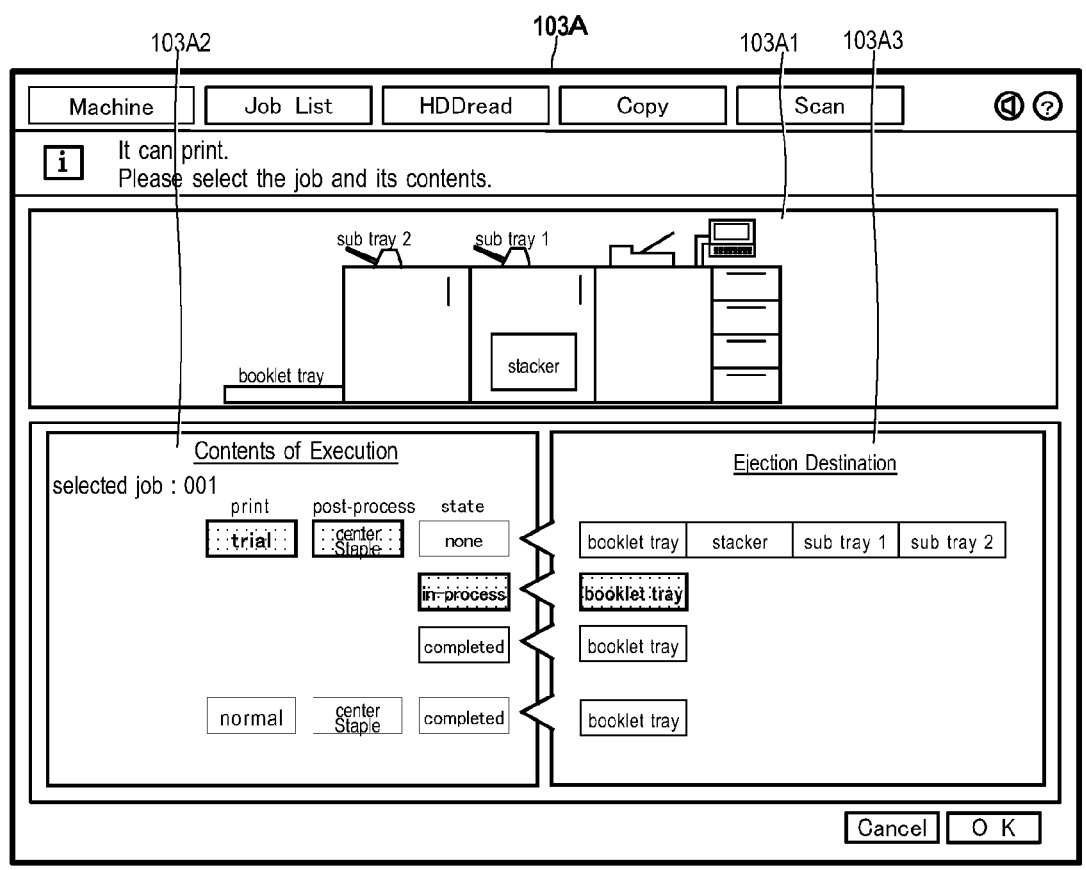
FIG. 10 is an explanatory diagram showing an exemplary display screen when image formation of the embodiment of the present invention is operated.

FIG. 10 shows still another example of the display screen 103A showing processing contents of the job of the image forming system of the present embodiment and settings of ejection destinations. The display screen 103A of FIG. 10 includes an ejection destination display section 103A1 graphically showing the ejection sections of the image forming system, an execution-content display section 103A2 showing an execution content of a selected job, and an ejection destination display section 103A3 showing the ejection destination of the selected job. Because the basic parts of FIG. 10 are the same as those in FIG. 8 and FIG. 9, the duplicated parts are not described again.

On the execution-content display section 103A2 of FIG. 10, there are "Trial" and "Normal" as options of print; there is "Saddle Stitching" as post-processing; and there are "No", "In-Process", and "Completion" as subordinate options of a state of execution of post-processing. Here, the trial print, the saddle stitching, and the in-process state are shown as the selected job.

Figure 11:
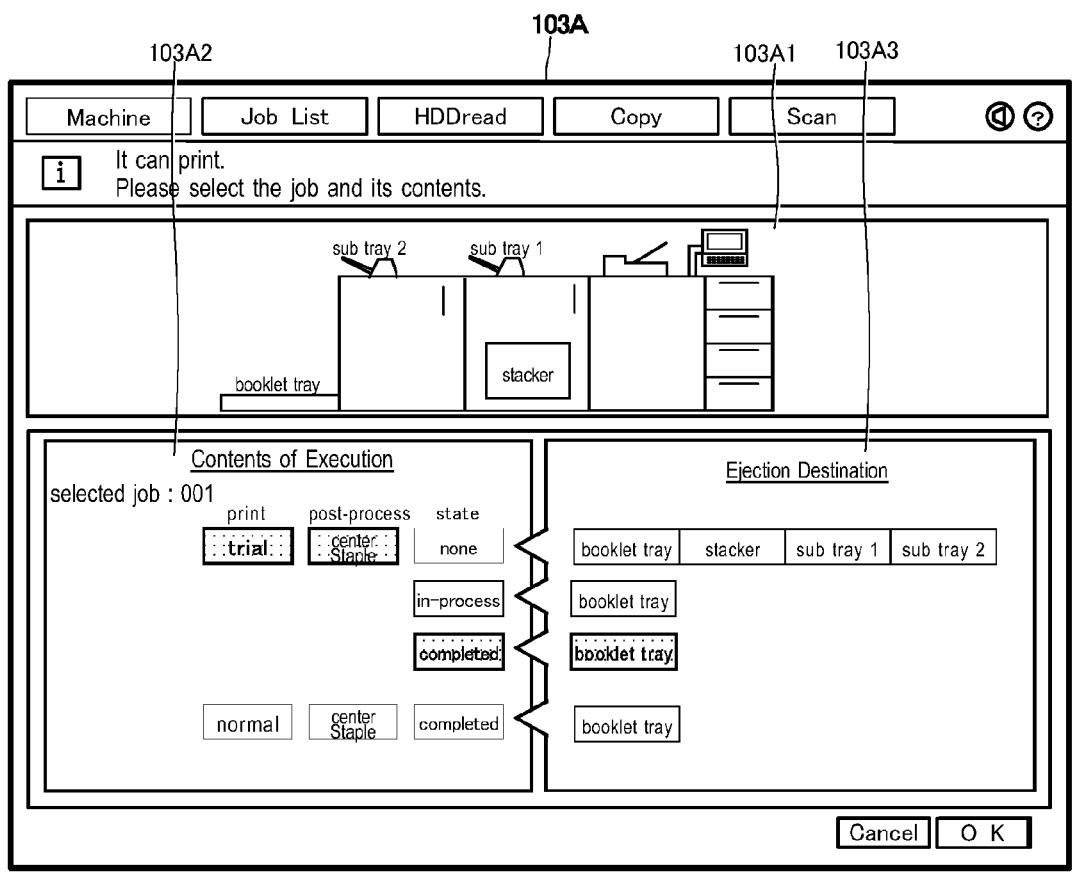
FIG. 11 is an explanatory diagram showing an exemplary display screen when image formation of the embodiment of the present invention is operated.

Further, the ejection destination display section 103A3 shows the state that the booklet tray is selected as the ejection destination, corresponding to the trial print in the in-process state of the saddle stitching as the selected job. FIG. 11 shows still another example of the display screen 103A showing processing contents of the job of the image forming system of the present embodiment and settings of ejection destinations. Because the basic parts of FIG. 11 are the same as those in FIG. 10, the duplicated parts are not described again.

On the execution-content display section 103A2 of FIG. 11, there are "Trial" and "Normal" as options of print; there is "Saddle Stitching" as post-processing; and there are "No", "In-Process", and "Completion" as subordinate options of a state of execution of post-processing. Here, the trial print, the saddle stitching, and the completed state are shown as the selected job.

Further, the ejection destination display section 103A3 shows the state that the booklet tray is selected as the ejection destination, corresponding to the trial print in the completed state of the saddle stitching as the selected job. Note that the specific examples of the display screen 103A of the operation/display section 103 are just examples, and various deformation may be made.

<Advantageous Effect of the Embodiment>

(1) According to the embodiment described above, the controller 101 controls the image forming system, with respect to the job for which post-processing is designated, such that images are formed on sheets in a state corresponding to the post-processing, on the image forming apparatus 100 and such that the post-processing is not completed on the sheets on which images are formed on the post-processing device 400, and the sheets are output as the trial print. Because the sheets are output with the images formed in the state corresponding to the post-processing, it is possible to accurately confirm the state of the post-processing from the state of the uncompleted sheet bundle without completing the final booklet.

(2) In above (1), the controller 101 controls such that the sheets on which the post-processing is not completed are output as a copy of a sheet bundle including a first page to a last page, corresponding to the job. Thus, it is possible to accurately confirm the state of the post-processing from the state of the sheet bundle corresponding to a booklet without completing the final booklet.

(3) In above (1) or (2), the image forming system includes an ejection switching section 306, 406, or the like which performs switching when ejecting the sheets, and the controller 101 controls the ejection switching section such that, when the sheets are ejected, the sheets are ejected in different states between the trial print and a print other than the trial print. Thus, an uncompleted sheet bundle is surely output, and it is possible to accurately confirm the state of the post-processing from the state of the sheet bundle.

(4) In above (3), the image forming system includes a plurality of ejection sections (the sheet stacking section 320, the sub-tray 390*s*, the main-tray 490*m*, and the booklet ejection tray 490*b*) to which the sheets are ejected, and the controller 101 controls the ejection switching section such that the sheets are ejected to different ejection sections (the sheet stacking section 320, the sub-tray 390*s*, main-tray 490*m*, the booklet ejection tray 490*b*) as the different states. Thus, an uncompleted sheet bundle is surely output, and it is possible to accurately confirm the state of the post-processing from the state of the sheet bundle.

(5) In above (3), the image forming system includes at least an ejection section (the sheet stacking section 320, the sub-tray 390*s*, the main-tray 490*m*, and the booklet ejection tray 490*b*) to which the sheets are ejected, and the controller 101 controls the ejection switching section such that the sheets are ejected to the same ejection section (the sheet stacking section 320, the sub-tray 390s, the main-tray 490m, and the booklet ejection tray 490b) at different positions as the different states. Thus, an uncompleted sheet bundle is surely output, and it is possible to accurately confirm the state of the post-processing from the state of the sheet bundle.

(6) In above (1) to (5), the controller 101 controls the image forming apparatus 100 such that conveyance of the sheets on the image forming apparatus 100, positions of the images formed on the sheets, and an order of forming the images satisfy predetermined conditions specified for the designated post-processing. Thus, it is possible to accurately confirm the state of the post-processing from the state of the sheet bundle on which images are formed, without completing the final booklet.

(7) In above (3) to (6), the controller 101 identifies the post-processing device 400 connected to the image forming apparatus 100, and controls the ejection switching section to switch, corresponding to the identified post-processing device 400. Thus, an uncompleted sheet bundle is surely output, and it is possible to accurately confirm the state of the post-processing from the state of the sheet bundle.

(8) In above (1) to (7), the controller 101 identifies the post-processing device 400 connected to the image forming apparatus 100, and controls switching of the ejection switching section to switch to a predetermined ejection section (the sheet stacking section 320, the sub-tray 390s, the main-tray 490m, and the booklet ejection tray 490b), corresponding to the identified post-processing device 400. Thus, an uncompleted sheet bundle is surely output, and it is possible to accurately confirm the state of the post-processing from the state of the sheet bundle.

(9) In above (1) to (8), the controller 101 selectively controls, with respect to the job for which post-processing is designated, such that only a part of the post-processing is executed on the sheets so as to put the sheets in an in-process state, or such that the sheets are put in a state that no post-processing is executed on the sheets, as the state that the post-processing is not completed on the post-processing device 400. Thus, the states are selectively used depending on demand, where in one of the states no post-processing is executed at all and in the other of the states only a part of the post-processing is executed. It is possible to accurately confirm the state of the post-processing from the state of the bundles of the sheets.

(10) In above (1) to (9), the controller 101 selectively controls, with respect to the job for which post-processing is designated, such that the sheets are ejected in the state that the post-processing is not completed, or such that the sheets are subjected to the post-processing and are ejected in a completed state. Thus, the states are selectively used depending on demand, where in one of the states the post-processing is not completed and in the other of the states the post-processing is completed. It is possible to accurately confirm the state of the post-processing from the state of the bundles of the sheets.

<Other Embodiments>

There is an image forming system in which a sheet is measured on the side of the image forming apparatus 100, before execution of post-processing, to obtain data with respect to basic parameters for producing a booklet such as sheet size information for alignment and sheet thickness information for determining a bending width. The measured data can be input, as adjustment parameters, from the image forming apparatus 100 to the post-processing device 400 by communication between the image forming apparatus 100 and the post-processing device 400.

In such image forming system, the above-described uncompleted trial print does not need to be executed to set the basic parameters. However, it is also possible to apply the uncompleted trial print by the procedure of FIG. 5, to meet the preferences of the operator.

In the above description, the controller 101 controls the various parts to realize the operation of the embodiments; however, the present invention is not limited to the embodiment. For example, the above-described control of the embodiments can also be executed from an external PC connected through a network.

The embodiments of the present invention have been described above with reference to the drawings; however, the specific configurations and the numerical values are not limited to those disclosed in the embodiments, and any modification and addition in the range which does not depart from the spirit of the present invention are included in the present invention.

What is claimed is:

1. An image forming system comprising:
    an image forming apparatus which forms images on sheets;
    a post-processing device which executes post-processing on the sheets on which the images are formed by the image forming apparatus; and
    a controller which controls the image forming apparatus and the post-processing device,
    wherein the controller controls such that the image forming apparatus forms the images on the sheets in a state corresponding to the post-processing as a trial print with respect to a job for which the post-processing is designated, and such that the post-processing device ejects the sheets in a state that the post-processing is not completed on the sheets on which the images are formed, and
    wherein the controller controls the image forming apparatus such that conveyance of the sheets by the image forming apparatus, positions of the images formed on the sheets, and an order of forming the images satisfy predetermined conditions specified for the designated post-processing.

2. The image forming system of claim 1, wherein the controller controls such that the sheets on which the post-processing is not completed are output as a copy of a sheet bundle including a first page to a last page, corresponding to the job.

3. The image forming system of claim 1, further comprising:
    an ejection switching section which performs switching when ejecting the sheets,
    wherein the controller controls the ejection switching section such that, when the sheets are ejected, the sheets are ejected in different states between the trial print and a print other than the trial print.

4. The image forming system of claim 3, further comprising:
    a plurality of ejection sections to which the sheets are ejected,
    wherein the controller controls the ejection switching section such that the sheets are ejected to different ejection sections as the different states.

5. The image forming system of claim 3, further comprising:
    at least one ejection section to which the sheets are ejected,
    wherein the controller controls the ejection switching section such that the sheets are ejected to different positions of a same ejection section as the different states.

6. The image forming system of claim 3, wherein the controller identifies the post-processing device connected to the image forming apparatus, and controls the ejection switching section to switch in accordance with the identified post-processing device.

7. The image forming system of claim 1, wherein the controller identifies the post-processing device connected to the image forming apparatus, and controls switching of the ejection switching section to switch to a predetermined ejection section in accordance with the identified post-processing device.

8. The image forming system of claim 1, wherein the controller selectively controls, with respect to the job for which the post-processing is designated, such that only a part of the post-processing is executed on the sheets so as to put the sheets in an in-process state, or such that the sheets are put in a state that no post-processing is executed on the sheets, as the state that the post-processing is not completed.

9. The image forming system of claim 1, wherein the controller selectively controls, with respect to the job for which post-processing is designated, such that the sheets are ejected in the state that the post-processing is not completed, or such that the sheets are subjected to the post-processing and are ejected in a completed state.

10. An image forming system control method for controlling an image forming system including an image forming apparatus which forms images on sheets, a post-processing device which executes post-processing on the sheets on which the images are formed by the image forming apparatus, and a controller which controls the image forming apparatus and the post-processing device, the method comprising:
controlling such that the image forming apparatus forms images on sheets in a state corresponding to post-processing as a trial print with respect to a job for which the post-processing is designated, and such that the post-processing device ejects the sheets in a state that the post-processing is not completed on the sheets on which the images are formed; and
controlling the image forming apparatus such that conveyance of the sheets by the image forming apparatus, positions of the images formed on the sheets, and an order of forming the images satisfy predetermined conditions specified for the designated post-processing.

11. The method of claim 10, further comprising controlling such that the sheets on which the post-processing is not completed are output as a copy of a sheet bundle including a first page to a last page, corresponding to the job.

12. The method of claim 10, wherein the image forming system includes an ejection switching section which performs switching when ejecting the sheets, and
wherein the method further comprises controlling the ejection switching section such that, when the sheets are ejected, the sheets are ejected in different states between the trial print and a print other than the trial print.

13. The method of claim 12, wherein the image forming system includes a plurality of ejection sections to which the sheets are ejected, and
wherein the method further comprises controlling the ejection switching section such that the sheets are ejected to different ejection sections as the different states.

14. The method of claim 12, wherein the image forming system includes at least one ejection section to which the sheets are ejected, and
wherein the method further comprises controlling the ejection switching section such that the sheets are ejected to different positions of a same ejection section as the different states.

15. The method of claim 12, further comprising:
identifying the post-processing device connected to the image forming apparatus; and
controlling the ejection switching section to switch in accordance with the identified post-processing device.

16. The method of claim 10, further comprising:
identifying the post-processing device connected to the image forming apparatus; and
controlling the ejection switching section to switch to a predetermined ejection section in accordance with the identified post-processing device.

17. The method of claim 10, further comprising selectively controlling, with respect to the job for which the post-processing is designated, such that only a part of the post-processing is executed on the sheets so as to put the sheets in an in-process state, or such that the sheets are put in a state that no post-processing is executed on the sheets, as the state that the post-processing is not completed.

18. The method of claim 10, further comprising selectively controlling, with respect to the job for which post-processing is designated, such that the sheets are ejected in the state that the post-processing is not completed, or such that the sheets are subjected to the post-processing and are ejected in a completed state.

* * * * *